United States Patent [19]

Raabe et al.

[11] Patent Number: 4,713,728
[45] Date of Patent: Dec. 15, 1987

[54] LIGHTING CIRCUIT BREAKER PANELBOARD MODULAR ASSEMBLY

[75] Inventors: Rodney D. Raabe; Joseph J. Mrowka; Jon P. McCuin, all of Bristol; Joseph F. Noonan, Manchester, all of Conn.

[73] Assignee: General Electric Company, New York, N.Y.

[21] Appl. No.: 892,605

[22] Filed: Aug. 4, 1986

Related U.S. Application Data

[62] Division of Ser. No. 705,454, Feb. 25, 1985, Pat. No. 4,631,634.

[51] Int. Cl.$^4$ .............................................. H02H 9/00
[52] U.S. Cl. .................................... 361/363; 361/353; 361/376
[58] Field of Search ............... 339/22 B; 361/331, 334, 361/346, 353–361, 363, 376

[56] References Cited

U.S. PATENT DOCUMENTS

| | | | |
|---|---|---|---|
| 3,211,960 | 10/1965 | Dorfman et al. | 361/376 |
| 3,354,357 | 11/1967 | Jorgensen et al. | 361/361 |
| 3,721,864 | 3/1973 | Rozenboom | 361/361 |

Primary Examiner—A. D. Pellinen
Assistant Examiner—Gregory D. Thompson
Attorney, Agent, or Firm—Richard A. Menelly; Walter C. Bernkopf; Fred Jacob

[57] ABSTRACT

A circuit breaker panelboard modular assembly employs a plurality of interdependent molded plastic and metal parts to multifunctionally adapt breakers of different ratings for electrical connection within the panelboard enclosure. Anti-turn connector connects the strap terminals. Captive bolts or plug-in connections are employed to attach the breakers to the power bus. A novel concealed hinge construction is used to connect the panelboard door to the panelboard housing and the breakers are individually identified within the housing by extruded plastic circuit markers.

6 Claims, 13 Drawing Figures

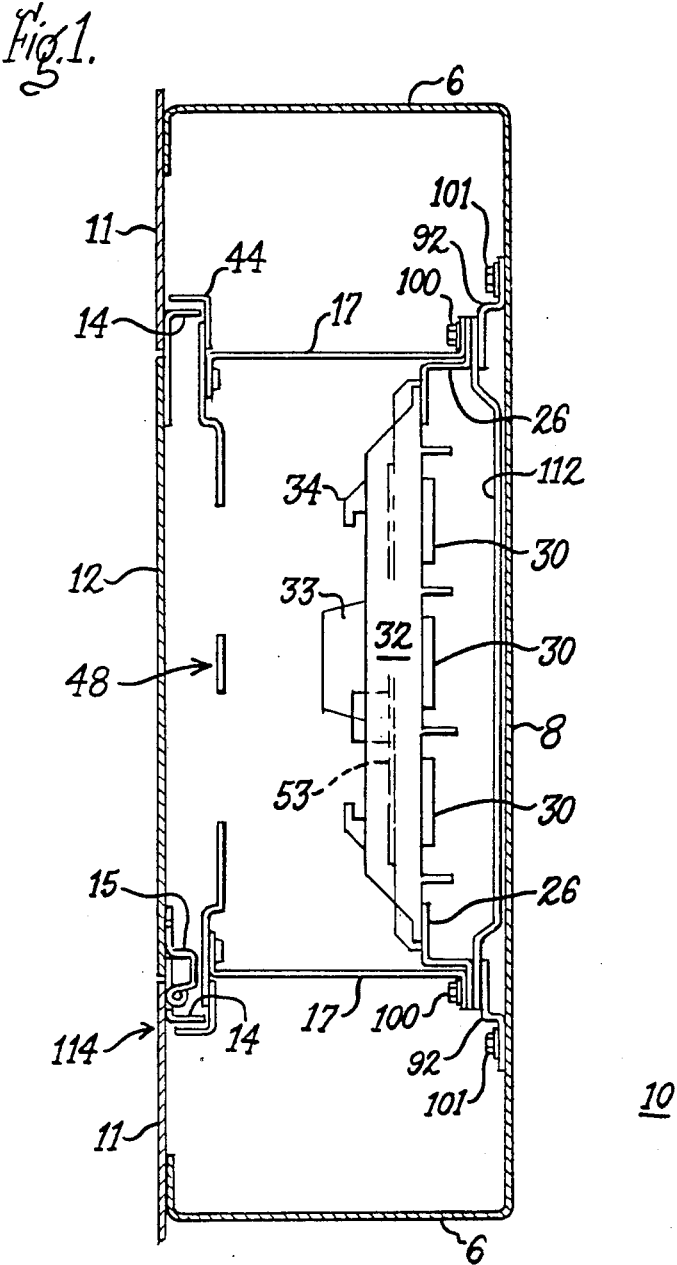

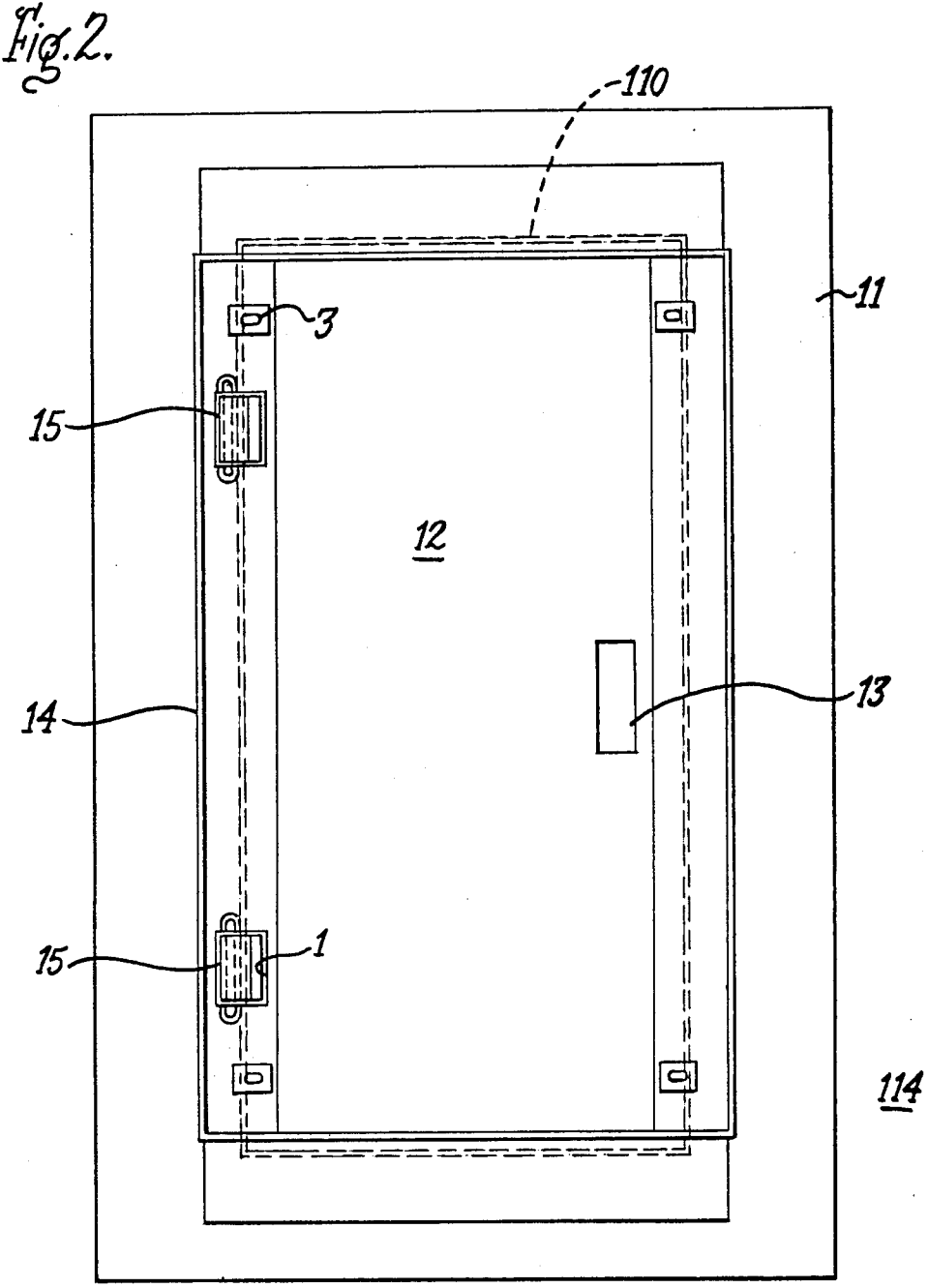

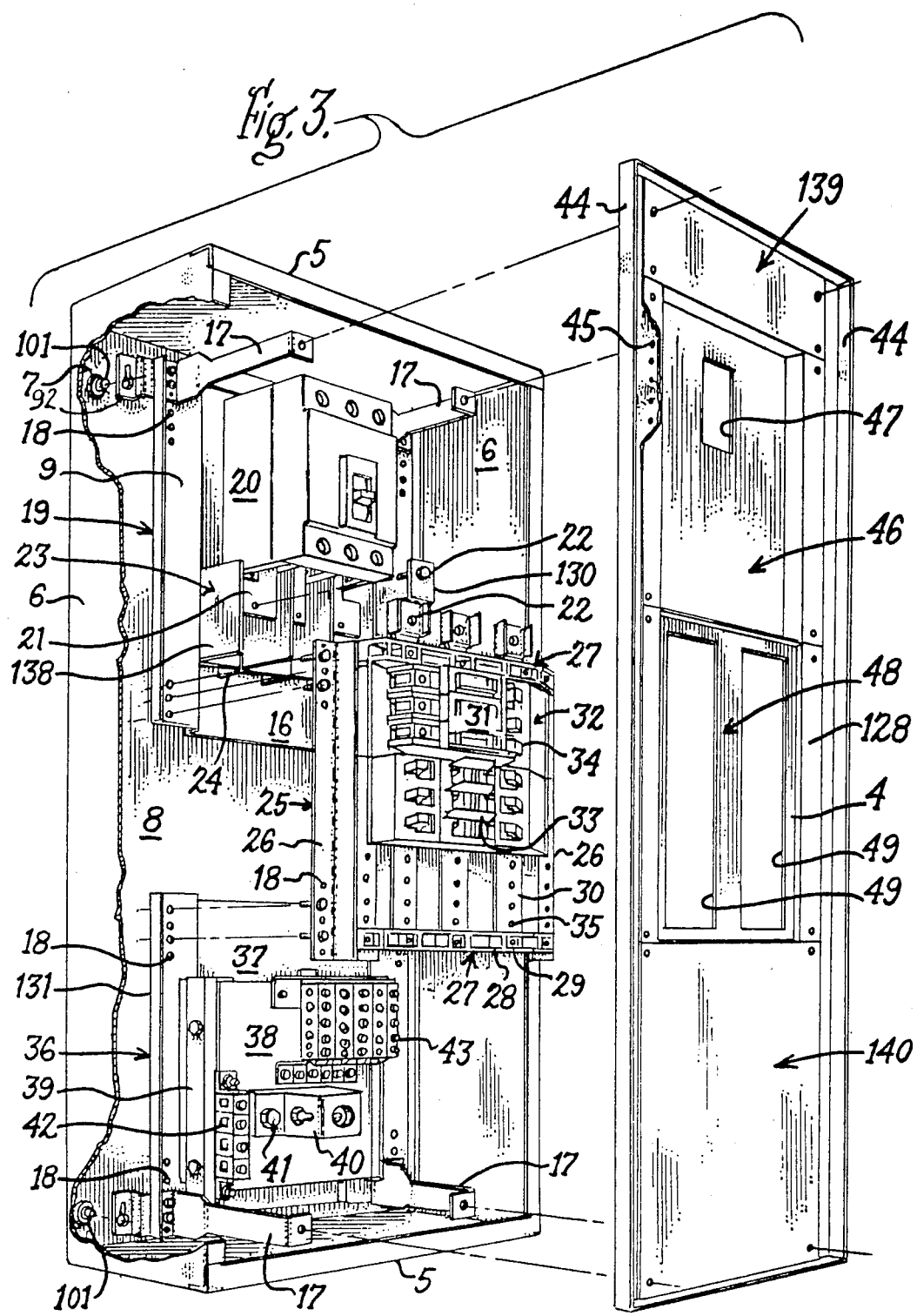

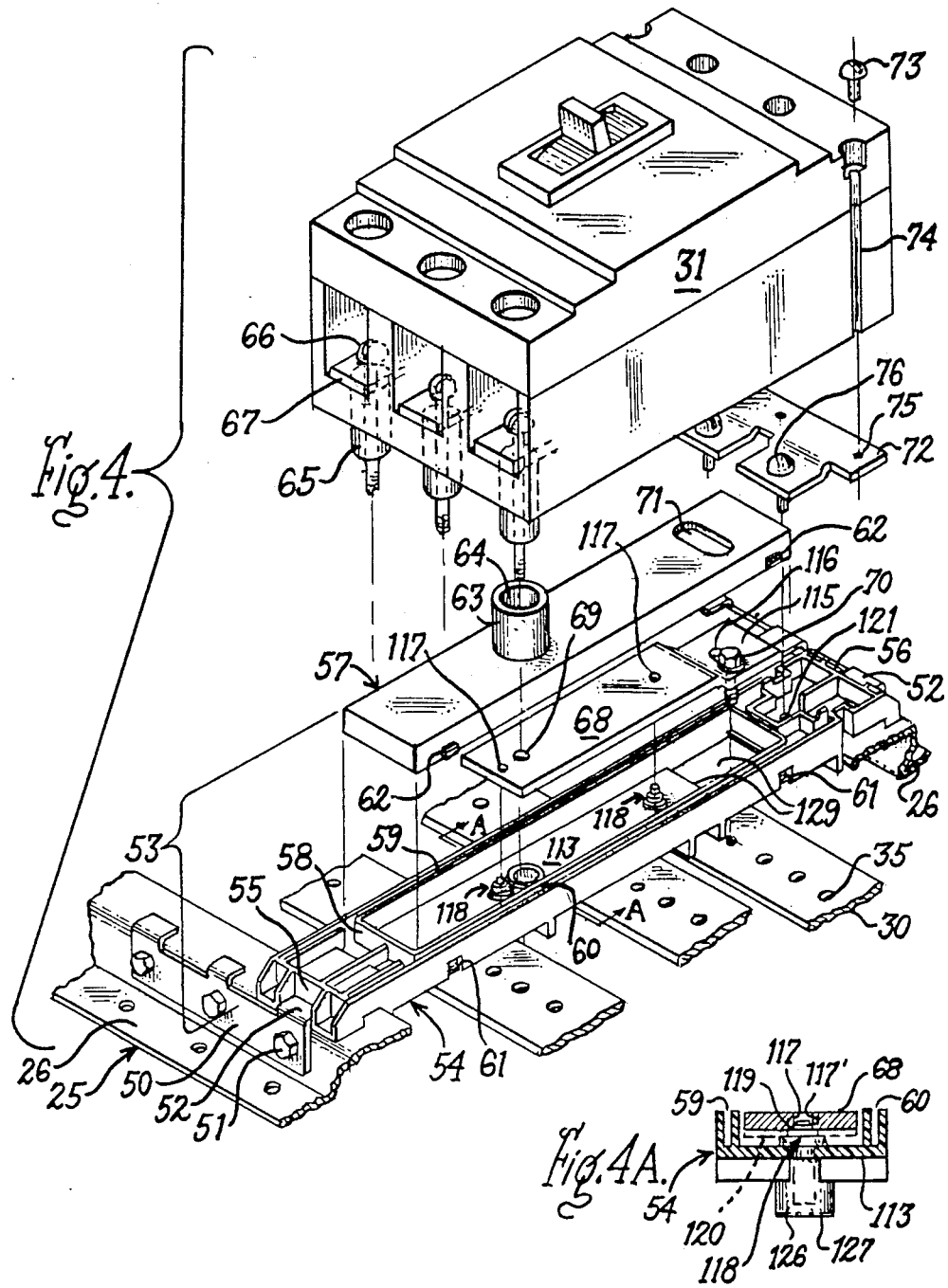

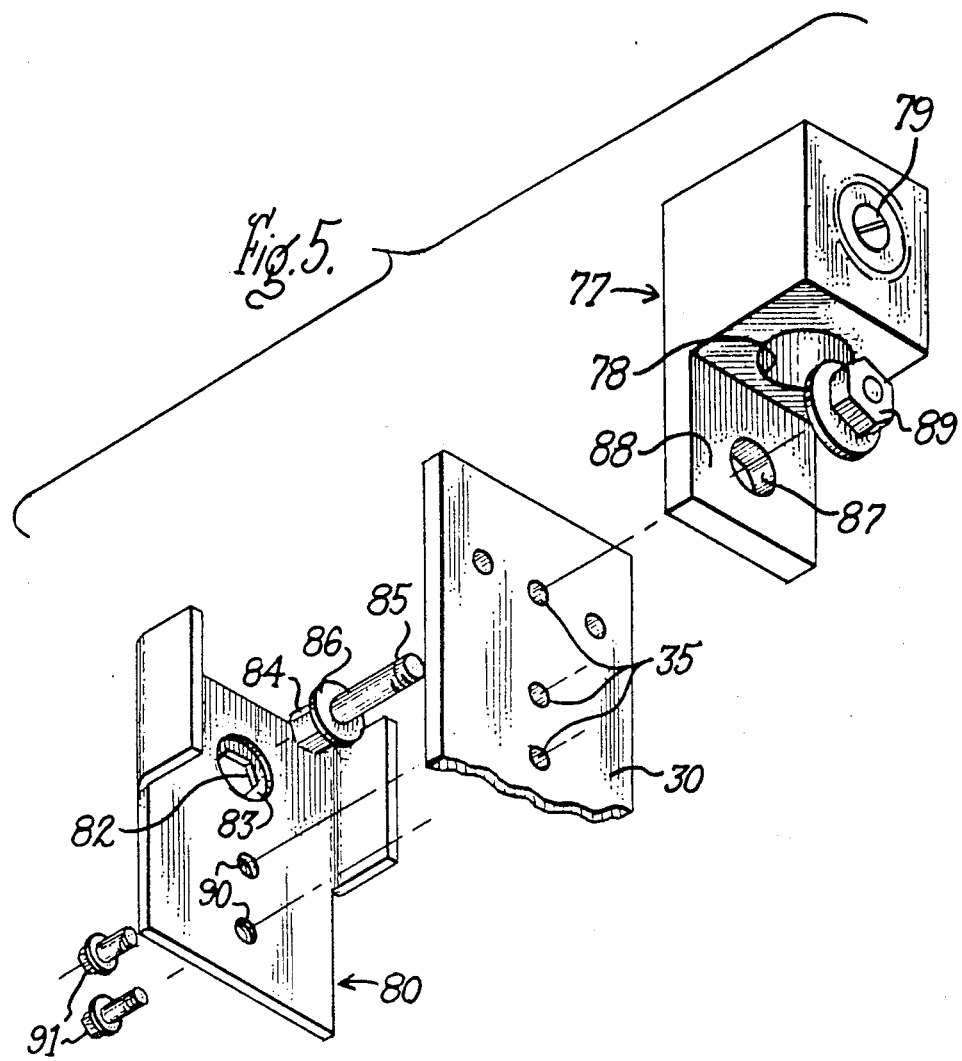
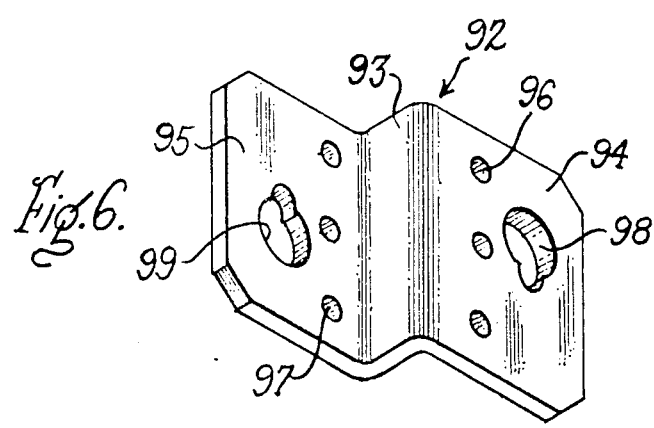

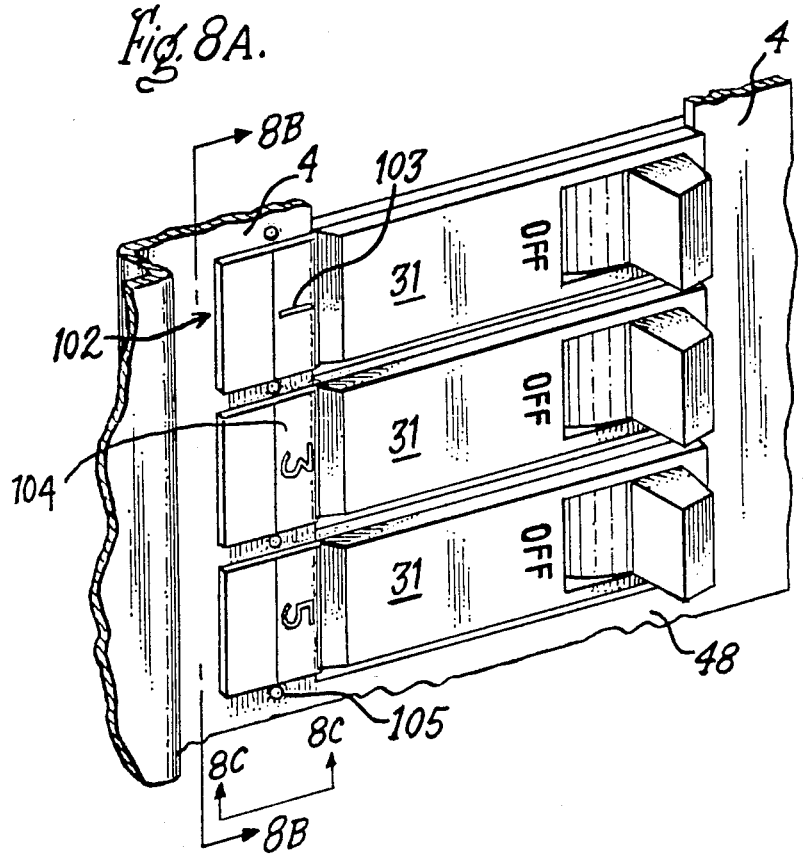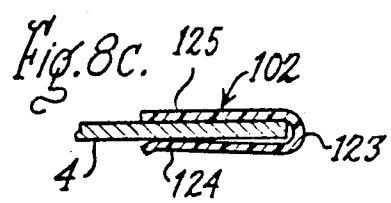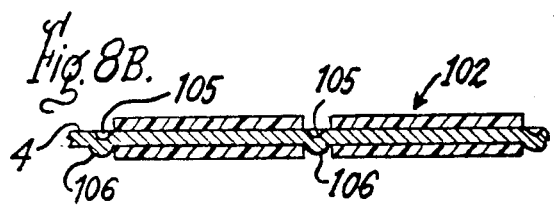

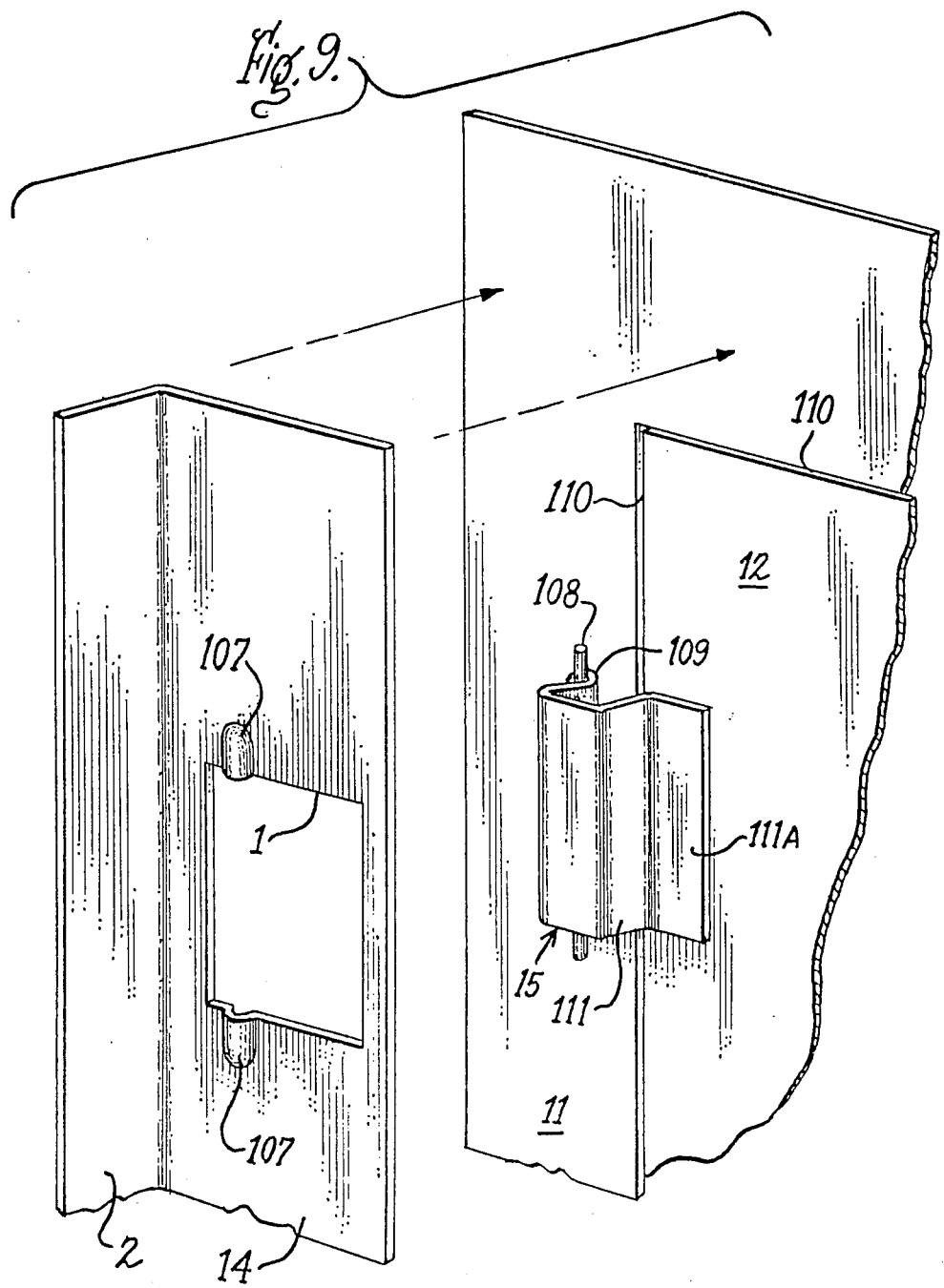

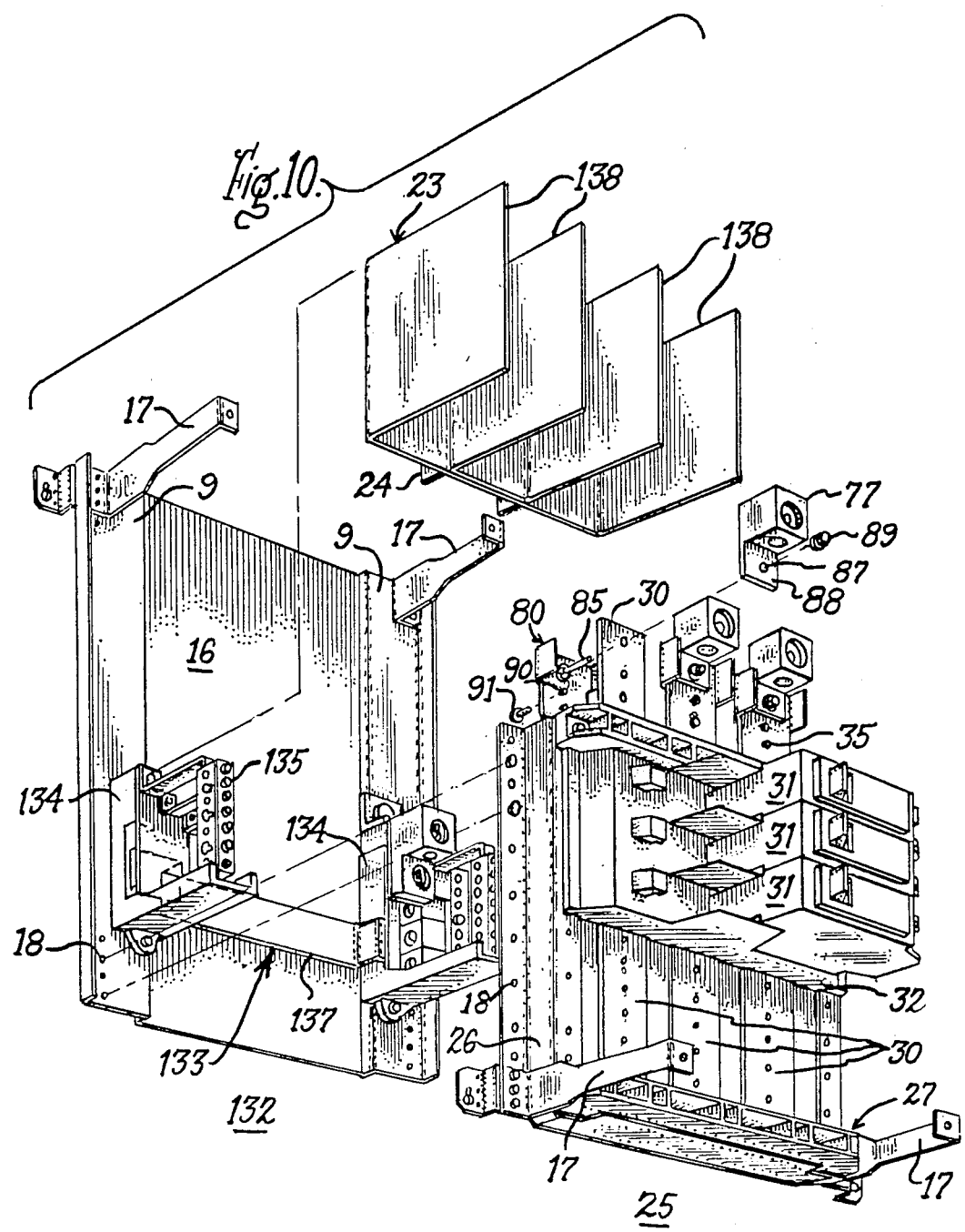

LIGHTING CIRCUIT BREAKER PANELBOARD MODULAR ASSEMBLY

This is a divisional of application Ser. No. 705,454, filed Feb. 25, 1985, now U.S. Pat. No. 4,631,634.

BACKGROUND OF THE INVENTION

The increased use of computers throughout the circuit breaker industry for inventory of circuit breaker components along with the automated assembly of the components into a finished product has correspondingly required a reduction in the large variety of components used with the various breaker ratings to make such automation practical as well as economically feasible. U.S. patent application Ser. No. 678,208 entitled "Automated Q-Line Circuit Breaker" in the name of Raymond Seymour et al. describes a 120/220 volt residential-type circuit breaker designed for completely automated assembly. U.S. patent application Ser. No. 500,643 in the names of Ronald Ciarcia et al. entitled "Circuit Breaker Design For High Speed Assembly" describes a 277/480 volt circuit breaker designed for commercial applications, which is capable of automated assembly, in part.

The industry trend toward the use of computerized inventory and parts simplification for circuit breaker manufacture implies that tremendous savings in time and materials can also be realized in the manufacture of the panelboards and load centers used to house the residential and industrial-type breakers. In the manufacture of industrial panelboards, for example, each breaker rating and design requires a tailored panelboard assembly for housing and supporting the breakers. Automation of industrial panelboard manufacture has heretofore been difficult to achieve because of the large variety of components required for the various breaker ratings. The use of sheet metal supports with insulating plates as well as the large variety of screws, rivets and bolts required to assemble the metal panelboard internal assembly has complicated earlier attempts to automatically assemble the panelboard enclosures.

The advent of high strength insulating plastic materials such as Noryl ® and Valox ® which are registered trademarks of General Electric Company for high temperature durable thermoplastic resins, has allowed the use of molded plastic components to multifunctionally provide the necessary insulation between the phase conductors as well as to space and support the breakers on the power buses.

One purpose of this invention is to describe an industrial circuit breaker panelboard design wherein the panelboard components are capable of use with circuit breakers over a wide range of ratings without requiring a correspondingly large variety of inventoried components and parts.

Another purpose of this invention is to propose a modular concept to circuit breaker panelboard assembly wherein the main breaker, branch breakers, neutral support and option support structures are configured for interconnection independent of length requirements. Any desired number of breakers can then be arranged on such a module and the module is then connected with the remaining modules of adjustable configuration. This modular concept can allow for a wide range of customer requirements with only minor modification of the panelboard interior.

SUMMARY OF THE INVENTION

The invention comprises an industrial circuit breaker panelboard design wherein molded plastic components are used to support and electrically isolate the electric power bus phase conductors and to adapt various breaker ratings for electrical connection with each of the power buses. The use of main and branch circuit breaker modules allows a wide variation in the number of breakers that can be arranged within the panelboard enclosure without modifying the panelboard interior. An integral panelboard door assembly containing a concealed durable hinge is used to simplify the external panelboard assembly. Anti-turn electrical connectors are used to interconnect the circuit breakers with the incoming electrical power conductors and captive bolts are used with the breakers to connect the breakers to the power buses.

BRIEF DESCRIPTION OF THE DRAWINGS

FIG. 1 is an end view in partial section of the panelboard modular assembly according to the invention;

FIG. 2 is a front view of the door assembly viewed from within the panelboard assembly according to the invention;

FIG. 3 is top perspective view in isometric projection of the internal components used within the panelboard assembly of FIG. 1;

FIG. 4 is a top perspective view in isometric projection of a circuit breaker prior to connection with the interior components depicted in FIG. 2;

FIG. 4A is a partial end section through the plane A—A of the branch strap adapter base depicted in FIG. 4;

FIG. 5 is a top perspective view of the anti-turn connectors used for connecting the circuit breaker depicted in FIG. 3 with the electrical power conductors;

FIG. 6 is top perspective view of an interior mounting bracket used within the panelboard assembly of the instant invention;

FIGS. 8A–8C are top perspective views and side sectional views of the circuit markers used within the panelboard assembly of the instant invention, FIG. 8B is a section through the plane 8B—8B and FIG. 8C is a section through the plane 8C—8C of the circuit markers depicted in FIG. 8A;

FIG. 9 is an enlarged top perspective view in isometric projection of the novel hinge arrangement used with the panelboard door assembly depicted in FIG. 1; and FIG. 10 is a top perspective view of an alternate embodiment of the panelboard assembly according to the invention.

DESCRIPTION OF THE PREFERRED EMBODIMENT

Figure 7:
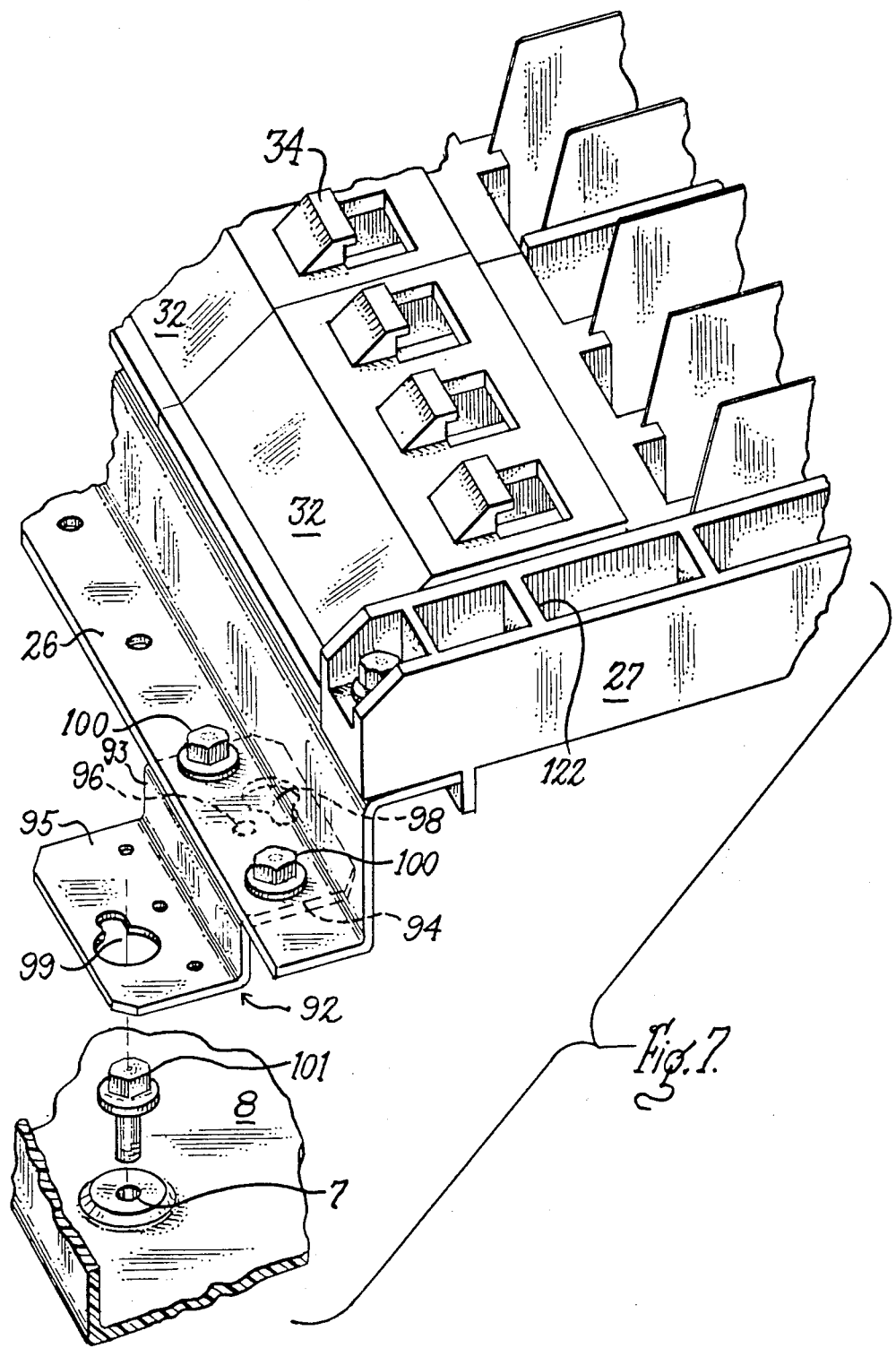
FIG. 7 is a top perspective view of the interior mounting bracket connecting with the interior of the panelboard assembly of the instant invention.

The lighting circuit breaker panelboard modular assembly of the invention is shown at 10 in FIG. 1 to consist of an enclosure bounded on both sides by a pair of opposing sidewalls 6 and a bottom pan 8. A door assembly 114 is arranged at the front of the assembly and consists of a face plate 11 which can be made of plastic or metal and which surrounds the door 12. A rabbet 14 surrounds the interior of the door assembly to provide a barrier in combination with the circuit breaker shield 48 also made of plastic or metal, which is positioned within the panelboard assembly by means of a pair of shield supports 17. Although not shown, the circuit breakers are arranged on top of a base 32 by means of the circuit breaker support hooks 34 and insulators 33 integrally formed within the base. The base is injection molded from Noryl plastic which was selected for its strength and good electrical resistance properties. Electrical connection is made with the power buses 30 which are attached to the bottom portion of the base. Each power bus carries one phase of a single or three phase power supply. The base is supported by means of a pair of side rails 26 which in turn are supported by a pan 112. A hinge 15 is arranged on the interior of the face plate and door in such a manner as to be completely concealed from the exterior of the door as seen by referring now to FIG. 2

FIG. 2 depicts the door assembly 114 as viewed from the interior of the panelboard assembly wherein the hinges 15 are shown attached between the door 12 and the rabbet 14 within a hinge opening 1 formed within the rabbet 14. A clearance gap 110 is provided between the door and the face plate, and the handle opening 13 is formed within the door to allow for the attachment of an operating handle and lock (not shown).

FIG. 3 shows the interior components prior to attachment within the panelboard assembly. A main circuit breaker module 19 is comprised of a pan 16 having L-shaped extensions 9 containing a plurality of holes 18 to facilitate attachment of the pan to the interior of the assembly. An insulating barrier 23 separated from the pan 16 by means of legs 24 is used to electrically isolate the circuit breaker connecting straps 21 by means of spaced insulating shields 138. Electrical connection is made between the bus bars 30 and the connecting straps 21 by means of three copper straps 130 and terminal screws 22, although only one is shown for purposes of clarity. A main circuit breaker 20 or a main terminal lug (not shown) is carried by the main circuit breaker module and a pair of upright shield supports 17 are provided on each of the L-shaped extensions 9 at one end of the module to support a pair of shield rails 44 at that end. A branch circuit breaker module 25 is shown to consist of a pair of opposing side rails 26 connected together by means of a pair of crossbars 27 which support and attach to the busbars 30 by means of bolts extending downward through the respective bolt recesses 29 formed in the cross bars and the bus holes 35 which extend along each of the buses, as indicated. A pair of crossbar side rails 28 are formed within the crossbars to provide additional support strength. The base 32 is supported both by the busbars as well as by the side rails and serves to support a number of branch circuit breakers 31 which are removably mounted on the circuit breaker support hooks 34 formed within the base 32 and separated by insulators 33. The neutral connection module 36 includes a neutral base 37 made of sheet metal which supports a pair of shield supports 17 at one end to which the opposite end of the pair of shield rails 44 are attached. The large number of holes 45 provided within the shield rails allows the shield supports 17 to be fastened at any desired location. The neutral connection module 36 further comprises a pair of opposing angle supports 39 of an insulating material on which a metal platform 38 is placed. A plurality of neutral connectors 42 are mounted at one side of the platform and a neutral lug 40 is fastened to the platform proximate the neutral connectors by means of a screw 41. The main circuit breaker module 19, branch circuit breaker module 25, and neutral connection module 36 are mechanically interconnected by overlaying an end portion of the branch circuit breaker module side rails 26 on an end portion of the main circuit breaker module side rail L-shaped extensions 9 and inserting at least two bolts on each side of the modules through the corresponding screw holes 18 and by overlaying an opposite end portion of the branch breaker module side rails 26 on an end portion of the neutral connection module side rails 131 and inserting at least two bolts on each side of the module through the corresponding screw holes 18. The variability in the length of the individual side rails for each individual module is an important feature of the instant invention. Earlier panelboard side rail length configurations generally fixed the panelboard interior dimensions and thereby limited the flexibility of the design. The arrangement of each individual pair of side rails for each individual module now allows a large amount of flexibility within a fixed panelboard length. Each module now is assigned one of the aforementioned functions, such as main breaker or branch breaker support for example, and the individual module lengths can be varied by simply adjusting the length of the respective side rails. Electrical connection is made with the neutral connection module by means of a plurality of neutral terminals 43 while electrical connection between the neutral connectors 42, neutral lug 40 and neutral terminals 43 is made by means of the metal platform 38. The main and branch circuit breaker modules are electrically interconnected by attaching the ends of the busbars 30 on the branch circuit breaker module 25 to the circuit breaker connection straps 21 by means of the terminal screws 22 and copper straps 130 as described earlier. The neutral connection module 36 is then abutted against the opposite end of the branch circuit breaker module 25. Once the individual modules are interconnected and the pair of shield rails 44 are attached, the subassembly is then arranged within the bottom pan 8 which consists of the opposing sidewalls 6 and the opposing end walls 5. A plurality of mounting holes 7 are arranged on the bottom of the bottom pan 8 to facilitate attachment within the field before the subassembly is inserted therein. A main circuit breaker shield 46 having a handle opening 47 for providing operative access to the main circuit breaker and a top shield 139 are supported between the shield rails 44 along with a branch breaker shield 48 which contains a shield shelf 4 along both sides of the shield and a pair of breaker access opening 49 through which the top of the branch breakers 31 extend. A neutral shield 140 is also supported between the same shield rails to completely shield the interior assembly.

When a larger rated branch circuit breaker is to be used within the branch circuit breaker module 25, the branch strap adapter 53 shown in FIG. 4 is used in place of the base 32 depicted earlier in FIGS. 1 and 3. The branch strap adapter is indicated in phantom in FIG. 1 to show its arrangement within the interior of the panelboard assembly 10. The branch strap adapter consists of a cover 57 and a base 54 both made of Noryl. The cover has a tube 63 integrally formed therein with an opening 64 defined for receiving a sleeve 65 arranged at one end of the branch breaker 31. Electrical connection is made between the branch breaker and one of the power buses 30 by fastening the captive screws 66 which extend through the circuit breaker terminal straps 67, sleeve 65 and tube 63 to a hole 69 tapped within the branch strap 68. A threaded bolt 70 is then inserted through the oblong hole 71 within the cover 57, and through the oblong hole 116 within an offset 115 formed at one end of the branch strap 68, where it is securely fastened to one of the power buses 30 within the bus hole 35 through the opening 129 formed in the bottom 113. Although only one branch strap adapter 53 is shown, there are three such adapters employed, one for each of the three power buses 30. When the branch circuit breaker is to be connected with the appropriate power bus 30 by means of the branch strap adapter 53, the cover 57 is first attached to the base 54 by fitting the edges of the cover within the linear passage 59, 60 defined between the outer walls of the base and the inner formed rectangle 58 as shown. Upon insertion of the edges of the cover 57 within the linear passage, four protrusions 62 formed on the outside of the edges of the cover become captured by four corresponding slots 61 formed in the sides of the base 54. The bottom 113 of the base 54 insulates the branch strap 68 from the other busbars which are not connected with the branch strap while providing access to one of the underlying bus bars 30 by means of the opening 129. A pair of unique busbar locating holes 117, extending through the branch strap 68, and posts 118, formed on the bottom 113, ensure the correct lineup between the circuit breaker captive screw 66 and the hole 69 within the branch strap 68 as well as between the slotted hole 116 within the branch strap and the underlying busbar hole 35. A circuit breaker support bracket 72 is attached to the base 54 by means of a screw 76 and a screw hole 121 formed in the base. Attachment between the branch breaker and the support bracket is made by means of a long screw 73 which extends through the circuit breaker mounting hole 74 and a hole 75 tapped within the support bracket 72. The assembled branch strap adapter 53 is attached to the side rails 26 by means of a pair of clamps 50 at each end of the adapter which attach to the side rails by means of bolts 51 and engage the recessed ends 55, 56 of the base by means of hooks 52.

The operation of the branch strap locating holes 117 and branch strap locating posts 118 is best seen by referring now to FIG. 4A. The branch strap 68 has either a narrow branch strap locating hole 117 or a wide branch strap locating hole 117' for positioning the branch strap within the branch strap adaptor base 54. The branch strap locating post 118 seats the bottom of the narrow branch strap locating hole 117 on a narrow shoulder 119 as indicated in solid lines and seats the bottom of the wide branch strap locating hole 117' on a wide shoulder 120 as indicated in phantom. The linear passages 59, 60 are seen to extend along both sides of the base 54 as indicated, and a hallow cylinder 126 integrally formed within the bottom 113 of the base 54 is located between the branch strap locating posts 118. The purpose of the cylinder 126, which is closed at the bottom as indicated at 127, is to allow for the clearance of the bottom shank of the circuit breaker captive screw 66 and to insulate the screw from the interior of the panelboard assembly.

Electrical connection between the busbars 30 with other electrical components is made by means of the anti-turn connector 80 shown in FIG. 5 which is first connected to the busbar 30 by means of a pair of screws 91 passing through a pair of screw holes 90 formed within the connector to a corresponding pair of screw holes 35 formed within the busbar. A bolt 85 having a hex head 84 and a formed washer 86 fixedly attached to the head is inserted within a hexagonal slot 82 formed within a recess 83 within the connector. The bolt is retained from passing through the hex slot by the engagement of the formed washer 86 within the recess 83. The busbar 30 is positioned such that the bolt 85 extends through the busbar hole 35 and through a corresponding hole 87 formed within a step 88 extending from the wire terminal lug 77. The hex nut 89 is threadingly attached to the bolt 85 and a conductor (not shown) is inserted within the opening 78 defined within the wire terminal lug before the screw 79 is employed to fasten the conductor within the lug.

In some lighting power distribution circuits, the main circuit breaker is not used and the branch circuit breaker then connects with the power circuit by means of three wire terminal lugs 77 as shown in both FIGS. 5 and 10. Although three phase power circuits, which require three wire terminal lugs are disclosed, this is by way of example only. It is well understood that in single phase power circuits, only two power buses are required and only two such wire terminal lugs would be emloyed. The neutral connection module is not generally used with this circuit arrangement and a split neutral assembly module 132 is used in its place. The branch circuit breaker module 25 shown in FIG. 10 is similar to that depicted in FIG. 3 and like reference numerals will be employed for similar components. The branch circuit breakers 31 are mounted on a base 32 and the busbars 30 are attached to the crossbars with side rails 26 running parallel to the bus bars. Instead of connecting the bus bars to a main breaker, three wire terminal lugs 77 are connected with the main conductor (not shown) and with the bus bars 30 in the manner depicted in FIG. 5. The ends of the bus bars are arranged between the lug connectors and corresponding anti-turn connectors 80 and are attached to the anti-turn connectors by means of bolts 91 which extend through bolt holes 90 on the anti-turn connector and are engaged within bolt holes 35 within the bus bars. The anti-turn connector 80 is connected with both the bus bars 30 and the wire terminal lugs by means of the bolt 85 and the hex nut 89 as described earlier. Referring again to FIG. 10, only one wire terminal lug 77 is indicated before attachment, with the other two lugs and anti-turn connectors already attached. Once the wire terminal lugs are attached to the branch circuit breaker module, the split neutral module is attached by placing a portion of the ends of the branch circuit breaker module side rails 26 over a portion of the split neutral module side rails and joining the modules by means of at least two bolts through the respective side rail bolt holes 18. When the modules are thus fastened together, the wire terminal lugs sit within the insulating barrier 23 and are insulated from each other by means of the insulating shields 138 and from the pan 16 by means of the legs 24. Neutral connections are made with the split neutral assembly module 132 by means of the split neutral assembly 133 which basically consists of a pair of insulating terminal bases 134 joined by means of a connecting strap 137. Individual circuit connections are made by means of a plurality of terminal connectors 135 arranged on both of the terminal bases. Once the two modules are attached together, a modified main breaker shield similar to that shown in FIG. 3, without the handle opening 47, is attached by means of the shield rails 44 and shield supports 17 to the split neutral assembly module 132. The branch breaker shield 48, also shown in FIG. 3, is connected to the branch circuit breaker module 25 by means of the shield rail and shield supports to complete the assembly.

The attachment between the side rails 26, and the bottom pan 8 is made by means of a plurality of bolts 100, 101 and angulated mounting brackets 92 best seen by referring to FIGS. 3, 6 and 7. The angulated mounting bracket 92 is shown in FIG. 6 to comprise a top step 94 and a bottom step 95 offset in opposite directions from a vertical riser 93. The bracket is formed from a single piece of metal and a keyhole-shaped slot 98 is formed in the top step along with several holes 96. A similar keyhole-shaped slot 99 is formed in the bottom step along with a plurality of holes 97. The keyhole-shaped top and bottom slots comprise dual diameter openings with the smaller diameter of one of the slots facing in an opposite direction from the other slot. This allows the angulated mounting bracket to be used in any orientation without having to use four separate mounting brackets oriented in four separated directions since it is desirable to provide the dual diameter slot configuration for ease in attachment of the bolt 101 indicated in FIG. 7 for attachment within a screw hole 7 arranged within the bottom pan 8. The provision of the angulated mounting brackets 92 assure that the bases 32 are provided with sufficient support and that the cross bars 27 are firmly supported within the panelboard assembly. Further support is provided to the cross bars 27 by means of a plurality of ribs 122 formed during the molding process. Prior art side rails were fixedly attached to the bottom on only the ends of the side rails since the side rail length was a constant dimension. The provision of several mounting brackets having side rail receiving holes 96, 97 and bottom pan receiving keyhole shaped slots 98, 99 now allows the module side rails to be attached at any desired location.

FIG. 8A shows a plurality of branch breakers 31 attached within the panelboard assembly and each containing a circuit marker 102 containing identifying indicia 103 in the form of numbers identifying each particular branch breaker with a particular circuit. After the circuit breakers are connected either by means of a base 32 such as described earlier with reference to FIG. 3, or by means of the branch strap adapter 53 described earlier with reference to FIG. 4, the branch breaker shield 48 best seen in FIG. 3 is placed over the breakers by mounting the shield platforms 128 on the shield rails 44 which were previously attached to the assembly by means of shield supports 17. The circuit markers 102 are attached to the shield shelf 4 prior to placing the shield over the branch breakers. The circuit marker 102 as detailed in FIGS. 8B and 8C consists of a U-shaped clip configuration made of a durable plastic material and defining a bight portion 123 with a pair of legs 124, 125 formed such that the legs toe in towards each other to firmly hold the circuit marker to the shield shelf 4. To prevent the circuit markers from sliding along the shelf, a plurality of dimples 105 are formed along the shelf extent such that a downward protrusion 106 best seen in FIG. 8B prevents each of the circuit markers 102 from moving along the shelf. A matte surface 104 is formed on the circuit marker by abrasion or otherwise roughening the plastic surface so that a ball point pen or pencil can be used to write the description of the appliances or lighting fixtures which are protected by the indicated branch breaker.

The integrally formed hinges 15 shown attached to the inner surface of both the face plate 11 and the door 12 are attached to the door and face plate by the assembly depicted in FIG. 9. The door 12 is initially cut from a single sheet of steel defining a clearance gap 110 between the face plate 11 and the door 12 as indicated. The hinge 15 is formed from a single sheet of steel and defines a formed circular end 109 and an L-shaped end 111 as indicated. The flat portion 111A of the L-shaped end is robotically welded to the door 12 and a pin 108 is inserted within the formed circular end 109. A rabbet 14 formed from a single steel plate bent at right angles to provide a telescoping extension 2 along its entire length is used to hold the hinge 15 between the face plate and the door. The rabbet has a hinge opening 1 cut in the vicinity of the hinges proximate the top and bottom of the door and a pair of formed semi-circular protrusions 107, which correspond to and capture the pins 108, when the rabbet is robotically spot-welded to the face plate 11 and the hinge 15 protrudes upwards through the hinge opening 1. When the rabbet is welded to the face plate, the door can freely open by the clearance provided the hinge through the hinge opening 1 and pins 108 can rotate within the formed circular protrusions 107. It is noted that with the door 12 both in its open and closed positions, the formed hinge 15 is completely inaccessible from the front surface of the panelboard assembly.

A review of the drawing figures indicates that all the installment steps for the panelboard assembly components can be made in a "downward" motion which is intended for purposes of automated assembly. The interrelationship between the component parts is such that robotic installation of the components can be made as the parts proceed along a conveyor with each of the components arrayed along the conveyor for both installation and testing at each robot position.

Having described our invention, what we claim as new and desire to secure by Letters Patent is:

1. A circuit breaker panelboard assembly comprising:
   closure means housing at least one main circuit breaker and at least one branch circuit breaker;
   access means movably arranged on said closure means providing access to said main and said branch circuit breaker from outside of said closure;
   mounting means within said closure means supporting said branch circuit breaker and providing electrical connection between said branch circuit breaker and electrical bus bars within said closure means connectable with an external circuit; and
   shield means intermediate said access means and said main and branch circuit breakers preventing contact with electrical terminals on said main and branch circuit breakers;
   said mounting means comprising an adapter member having an insulative cover and an insulative base, said adaptor cover having first means integrally formed therein providing access to means electrically connecting said branch circuit breaker with a branch strap within said adapter base.

2. The circuit breaker panelboard assembly of claim 1 further including second means integrally formed on said adapter cover providing access to means electrically connecting said branch circuit breaker with one of said bus bars.

3. The circuit breaker panelboard assembly of claim 1 wherein said adapter cover includes protrusions and said adapter base includes corresponding slots receiving said protrusions and holding said adapter cover fixedly to said adapter base.

4. The circuit breaker panelboard assembly of claim 3 further including at least one branch strap locating pin integrally formed within a bottom surface of said adapter base.

5. The circuit breaker panelboard assembly of claim 1 further including a hollow cylinder integrally formed within said bottom surface and extending external to said adapter base.

6. The circuit breaker panelboard assembly of claim 4 wherein said locating pin has first and second diameters seating first and second sized holes through said branch strap.

* * * * *